(12) United States Patent
Chen

(10) Patent No.: US 6,643,240 B2
(45) Date of Patent: Nov. 4, 2003

(54) METHOD OF ADJUSTING THE DRIVE SPEED OF A CD DRIVE

(75) Inventor: Ling-Feng Chen, Hsinchu (TW)

(73) Assignee: Lite-On It Corp. (TW)

( * ) Notice: Subject to any disclaimer, the term of this patent is extended or adjusted under 35 U.S.C. 154(b) by 0 days.

(21) Appl. No.: 10/027,337

(22) Filed: Dec. 26, 2001

(65) Prior Publication Data

US 2002/0176339 A1 Nov. 28, 2002

(30) Foreign Application Priority Data

May 23, 2001 (TW) .......................................... 90112443

(51) Int. Cl.[7] .............................................. G11B 27/36
(52) U.S. Cl. ................. 369/53.3; 369/53.3; 369/124.06
(58) Field of Search ........................... 369/53.3, 124.06, 369/124.08, 124.14

(56) References Cited

U.S. PATENT DOCUMENTS 5,050,145 A * 9/1991 Yoshida .................... 360/73.03

* cited by examiner

Primary Examiner—Nabil Hindi
(74) Attorney, Agent, or Firm—Raymond Sun

(57) ABSTRACT

The speed of a CD drive that is coupled to a host can be adjusted by the steps of receiving a command from the host, calculating the processing speed required by the host for executing the received command, and adjusting the processing speed of the CD drive if the required processing speed of the host is either greater than or less than the current processing speed of the CD drive.

15 Claims, 2 Drawing Sheets

METHOD OF ADJUSTING THE DRIVE SPEED OF A CD DRIVE

BACKGROUND OF THE INVENTION

1. Field of the Invention

The present invention relates to a method of adjusting the drive speed of a compact disk (CD) based on the speed of the host system.

2. Description of the Prior Art

With the advent of double speed CD burners, the speed of the CD drive for reading data has also increased accordingly. However, an increase in the speed of the main motor of the CD drive will also result in an increase in vibration and heat, so that the data reading stability of the optical laser reading head will be affected, the performance of the CD drive will be greatly reduced, and the noise and power consumption will also be increased.

Generally speaking, high reading speeds are useful only when reading large amounts of data. On the other hand, high reading speeds are not necessary in certain applications, such as playing back music CD or VCD. In such applications, the speed only needs to be maintained at single to double speed, so that if the host (e.g., a computer system that is coupled to the CD drive) reads the data only for playback purposes, it will not require too high a speed. Therefore, if one can detect the speed that the host actually requires for the CD drive to perform a particular function (e.g., read data for playback), then the speed of the CD drive can also be set accordingly to avoid unwanted noise and waste of power.

One conventional method of reducing the speed of the CD drive attempts to use software together with a detection mechanism to detect the vibration or bias track through the CD drive. Unfortunately, an additional detection circuit must be added to accomplish this.

Another conventional method of reducing the speed of the CD drive is shown in FIG. 1, and uses only software to accomplish this. According to this method, the user uses the status of the eject key of the CD drive to inform the processor that the speed needs to be adjusted. For example, the status of the eject key is checked every 10 ms using the control chip inside the CD drive. As long as the eject key is not pressed, the signal remains high which means that no speed adjustment is needed. On the other hand, if the eject key is pressed, the signal will be low which means that either the user truly desires to eject the CD-ROM, or the user wishes to adjust the speed of the CD drive. This method uses a time threshold to distinguish between a typical eject operation and the user's instruction to adjust the speed.

Referring now to FIG. 1, the CD drive is first set at a low transmission double speed in step 10, the time counter is reset to zero in step 11, and then step 12 detects whether the eject key is being held and not released.

If the eject key is not being held, then processing returns to step 12 for continuous detection. In this situation, there is obviously no requirement or instruction to adjust the speed of the CD drive.

On the other hand, if the eject key is being held, then in step 13, the eject key will output a low level signal to the the control chip to start the time counter to begin counting. In addition, the value of the time counter is checked to see if it is more than five seconds. Usually, if a user desires to perform a normal eject operation, the user will only need to press the eject key for a short period of time. Thus, the five seconds is essentially a threshold that can be selected to see if the user is deliberately pressing on the eject key for a time period that is longer than normally required to effectuate a normal eject operation.

As a result, if the value of the time counter is not more than five seconds, then the method considers this to be the situation where the user desires to perform a normal eject operation, so processing proceeds to step 14 where the tray of the CD drive is ejected, and the processing then returns to step 11.

On the other hand, if the value of the time counter is more than five seconds, then this is a clear manifestation of the user's intention to adjust the speed of the CD drive. As a result, in step 15, the control chip enables the LED on the CD drive, so that the LED flashes to indicate to the user that the CD drive has acknowledged the user's instruction to adjust the speed. The switch of the CD drive can then be adjusted, for example, to a higher speed (e.g., the maximum speed that the CD drive itself is capable of). When the user presses the eject key in the conventional manner to perform a normal eject operation, the CD drive will then eject the tray, and return to the original transmission at the low speed.

Unfortunately, the steps described above in the conventional method of FIG. 1, in particular pressing on the eject key for more than five seconds, require human operation, so they are rather inconvenient.

In light of the above, there remains a need for a method of adjusting the speed of the CD drive that avoids the drawbacks described above.

SUMMARY OF THE DISCLOSURE

It is an object of the present invention to provide a method for adjusting the speed of a CD drive based on the speed of the host operating system or application program in order to avoid unnecessary noise and power consumption due to excessive speed.

To accomplish the objects stated above, the present invention provides a method of adjusting the speed of a CD drive that is coupled to a host, which includes the steps of receiving a command from the host, calculating the processing speed required by the host for executing the received command, and adjusting the processing speed of the CD drive if the required processing speed of the host is either greater than or less than the current processing speed of the CD drive.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

Figure 1:
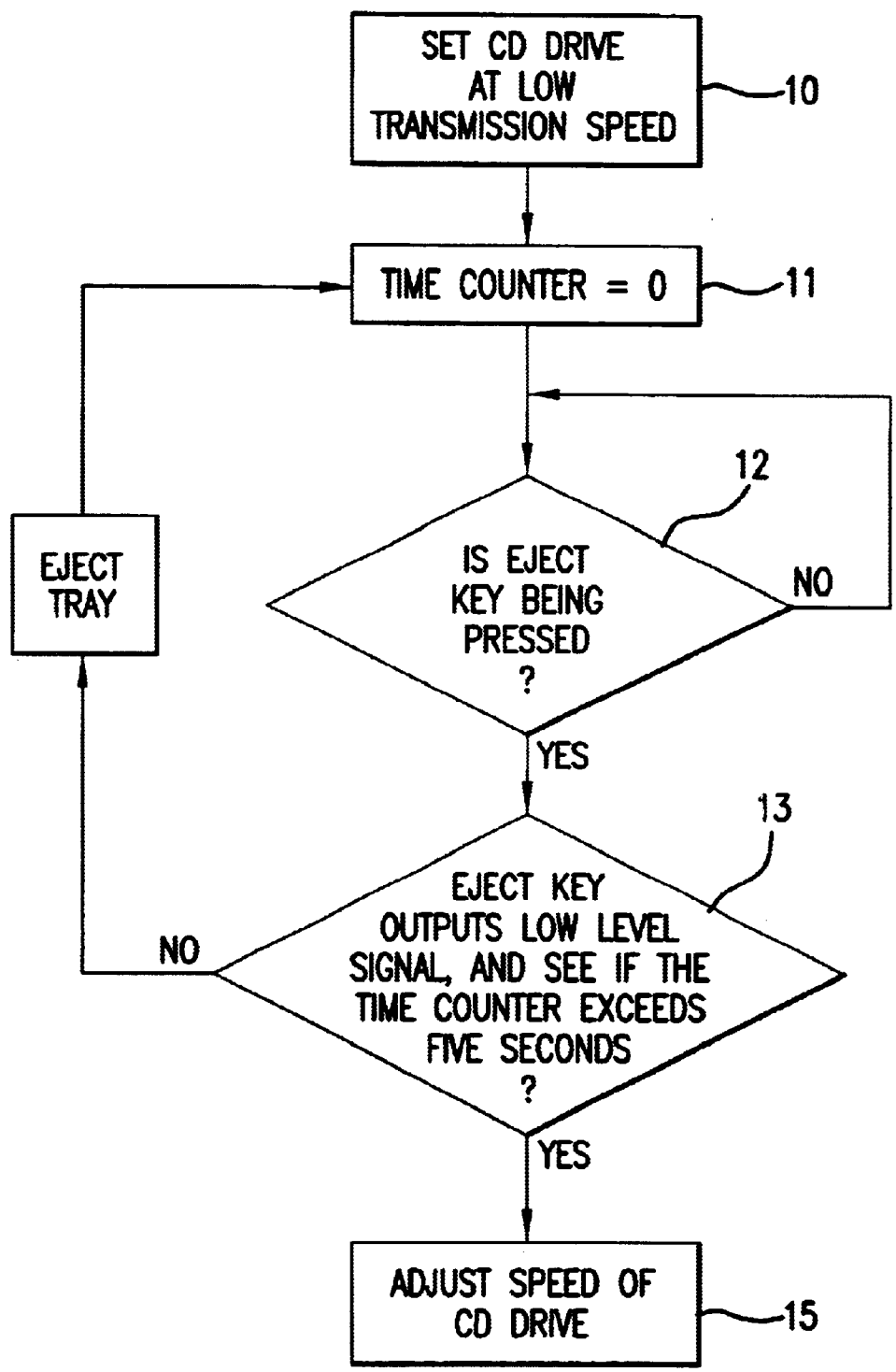
FIG. 1 is a flowchart illustrating a conventional method for adjusting the speed of the CD drive.
Figure 2:
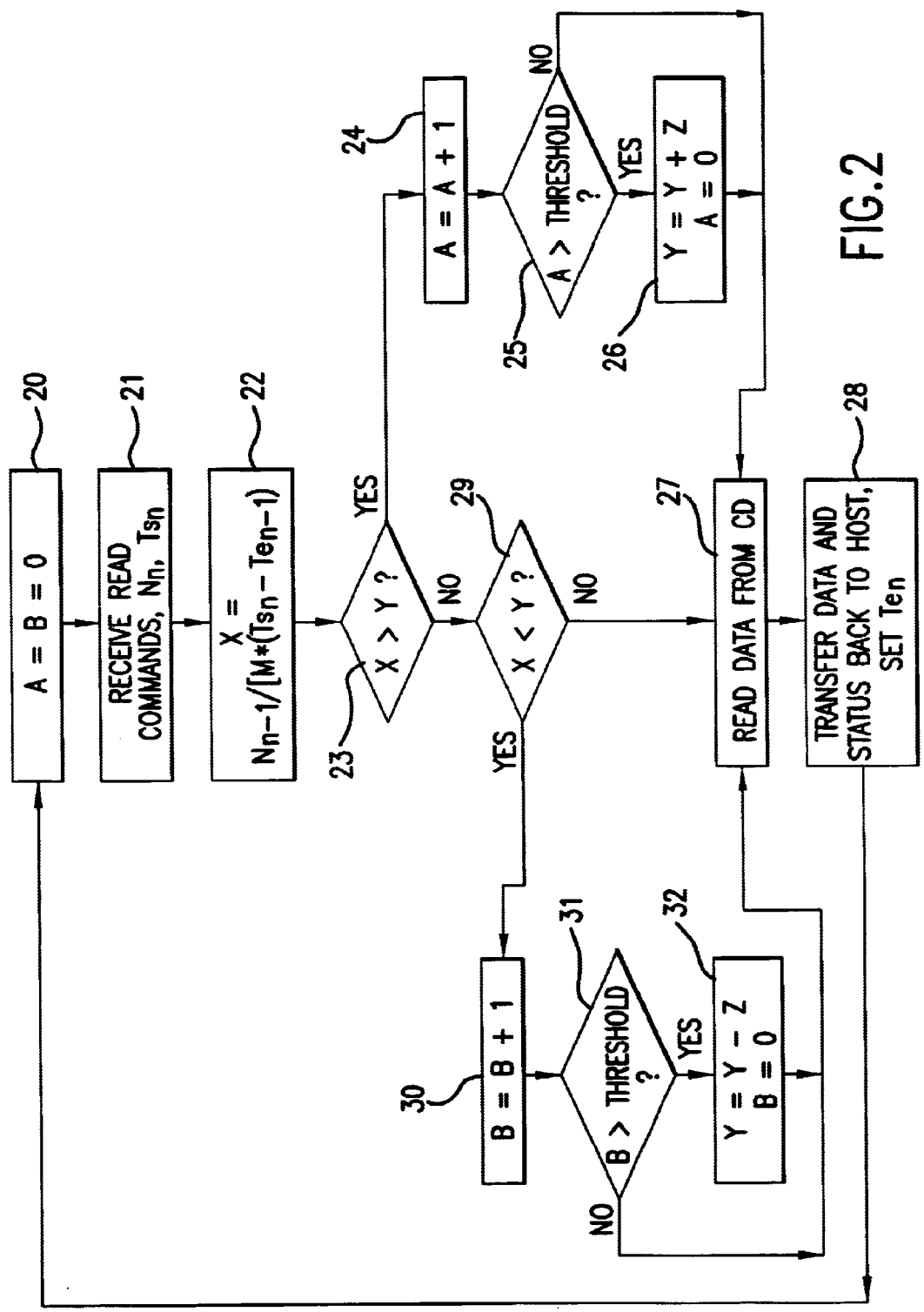
FIG. 2 is a flowchart illustrating a method for adjusting and setting the speed of a CD drive according to the present invention.

FIG. 2 is a flow chart that illustrates a method of the present invention for adjusting and setting the speed of the CD drive based on the speed of the host (e.g., the computer operating system that the CD drive is connected to). The present invention relates to a method for automatically setting the speed of the CD drive by self-detection of the speed of the host. As an example, at single speed the CD drive may read 75 blocks per second, while at double speed it may read 150 blocks per second, and so on. Thus, based on a predetermined desired speed, after the host gives the CD drive a read command to read N blocks, if the interval to give the CD drive the next reading command is T seconds, then the data reading/processing speed X that the operation requires can be estimated using the following equation:

$$X = N/(M \times T) \tag{1}$$

where M is the basic single speed for the CD drive, such as 75 or 150 blocks per second.

Here, the required data reading/processing speed X represents the number of blocks that is read in a given period of time. In other words, X is the data processing speed at the host. The time T is $(Ts_n - Te_{n-1})$, as described below in equation (2). On the basis of the above equation (1), the requirements of the host can be satisfied only if the CD drive speed is set slightly higher than the required data reading/processing speed X of the host. With the above premises, the present invention provides the following steps, as illustrated in FIG. 2:

Step 20: A and B are preset to zero, and each represents different unit counts that are to be used in steps 24–26 and 30–32 below. Processing then proceeds to step 21.

Step 21: In this step, read commands are received from host (either the operating system or the application program), and these read commands specify Nn (i.e., the number of blocks read by the instant read command), and $Ts_n$ (i.e., the time value to begin reading, which also represents the exact time that the CD drive receives the instant read command). Processing then proceeds to step 22.

Step 22: X, the reading/processing speed required by the host for the current operation, is derived based on calculating: (a) $N_{n-1}$, the number of blocks of the previous reading; (b) $Te_{n-1}$, the exact time when the previous read command ends; and (c) $Ts_n$, the exact time that the CD drive receives the instant read command. This can be accomplished by the following equation:

$$X = N_{n-1}/[M \times (Ts_n - Te_{n-1})] \tag{2}$$

This equation (2) is based on the concepts of equation (1) above. For example, the time interval (T) is determined by the difference between the time when the previous reading is over and the time when the present reading begins $(Ts_n - Te_{n-1})$.

Step 23: In this step, it is determined whether the required reading/processing speed X calculated in step 22 is greater than Y, which is the current reading speed of the CD drive. If the required speed X of the host is greater than the current reading speed Y of the CD drive, then processing proceeds to step 24, otherwise processing proceeds to step 29.

Step 24: In this step, the value of unit count A is incremented by 1. In other words, A=A+1.

Step 25: In this step, it is determined whether A is greater than the threshold value. In other words, this step attempts to see the number of consecutive times that the required speed X of the host is greater than the current reading speed Y of the CD drive. Thus, the threshold value is a selected number of consecutive times that the required speed X is greater than the current reading speed Y of the CD drive. This threshold value can be selected based on prior application experience and trial-and-error techniques. If A is greater than the threshold (i.e., the required speed X of the host is greater than the current reading speed Y of the CD drive for n consecutive times, where n exceeds the threshold), then the reading speed Y of the CD drive needs to be adjusted to be consistent with the required speed X of the host, and processing proceeds to step 26. Otherwise, if A is not greater than the threshold, no speed adjustment is needed and processing proceeds to step 27.

Step 26: In this step, the reading speed Y of the CD drive is increased by a value Z to try to make the reading speed Y of the CD drive as close as possible to the speed X of the host. The value Z can be a preset amount (e.g., 4 times the existing speed) that is applied to all speed increases in step 26, or can vary based on the desired application and other system characteristics. The selection of the value Z can also be adjusted to provide greater or lesser stability in the reading speed Y of the CD drive. To illustrate these principles, as one example, if each speed increase (i.e., each Z) is accomplished by 2 times the existing speed, then more time is required before the reading speed Y of the CD drive reaches the desired speed (i.e., the speed X) because the steps 24–28 and 20–23 in the flowchart of FIG. 2 need to be executed a few more times. This provides more stability for the reading speed Y. On the other hand, if each speed increase (i.e., each Z) is accomplished by 8 times the existing speed, then it is possible that a single speed increase (of 8 times the existing speed) may have increased the reading speed Y of the CD drive too much so that a subsequent speed decrease may be immediately needed to bring the reading speed Y closer to the speed X. This would introduce instability into the reading speed Y since there might be numerous speed fluctuations (i.e., increases and decreases). In any case, the value Z is preferably a value that will bring the speed Y close enough, or greater than, the speed X. This speed increase can be performed by the firmware in the CD drive. A is then reset to 0, and processing then proceeds to step 27.

Step 27: In this step, data from the CD drive is read using the unchanged speed Y from step 25, or the increased speed Y that is calculated from step 26.

Step 28: In this step, the data and status are transferred back to the host operating system or the application program. In addition, the time value when the present reading operation has been completed is set as $Te_n$, and processing returns to step 20.

Step 29: In this step, it is determined whether the required reading/processing speed X calculated in step 22 is less than Y, which is the current reading speed of the CD drive. If the required speed X is less than the current reading speed Y of the CD drive, then processing proceeds to step 30. If the reading speed X of the host is not less than the current reading speed Y of the CD drive, then processing proceeds to step 27, which indicates that the reading speed X that the operation requires is the same as the current reading speed Y of the CD drive.

Step 30: In this step, the value of unit count B is incremented by 1. In other words, B=B+1.

Step 31: In this step, it is determined whether B is greater than the threshold value. In other words, this step attempts to see the number of consecutive times that the required speed X of the host is less than the current reading speed Y of the CD drive. Thus, the threshold value is a selected number of consecutive times that the required speed X of the host is less than the current reading speed Y of the CD drive. This threshold value can also be selected based on prior application experience and trial-and-error techniques. If B is greater than the threshold (i.e., the required speed X of the host is less than the current reading speed Y of the CD drive for n consecutive times, where n exceeds the threshold), then the reading speed Y needs to be adjusted, and processing proceeds to step 32. Otherwise, if B is not greater than the threshold, no speed adjustment is needed and processing proceeds to step 27.

Step 32: In this step, the reading speed Y of the CD drive is decreased by a value Z to try to make the speed Y of the CD drive close enough to the speed X of the host. The value Z can be a preset amount (e.g., 4 times the existing speed) that is applied to all speed decreases in step 32, or can vary based on the desired application and other system characteristics. The principles here are similar to those set forth above for step 26. In any case, the value Z is preferably a value that will bring the speed Y close enough, or less than, the speed X. This speed decrease can be performed by the firmware in the CD drive. B is then reset to 0, and processing then proceeds to step 27.

Therefore, the method of the present invention automatically sets the speed of the CD drive speed by using system self-detection, and performs this operation efficiently without the need for additional circuits or external power, and by avoiding noise and high power consumption.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A method of adjusting the speed of a CD drive that is coupled to a host, comprising:

receiving a command from the host;

calculating the processing speed required by the host for executing the received command; and increasing the processing speed of the CD drive if the required processing speed of the host is greater than the current processing speed of the CD drive.

2. The method of claim 1, further including:

decreasing the processing speed of the CD drive if the required processing speed of the host is less than the current processing speed of the CD drive.

3. The method of claim 1, wherein the step of increasing the processing speed of the CD drive further includes:

determining whether the required processing speed of the host is greater than the current processing speed of the CD drive for n consecutive commands.

4. The method of claim 2, wherein the step of increasing the processing speed of the CD drive further includes:

determining whether the required processing speed of the host is less than the current processing speed of the CD drive for n consecutive commands.

5. The method of claim 4, wherein the step of increasing the processing speed of the CD drive further includes:

determining whether the required processing speed of the host is greater than the current processing speed of the CD drive for n consecutive commands.

6. The method of claim 1, further including:

reading data from a disc in the CD drive.

7. The method of claim 1, wherein the processing speed required by the host for executing the received command is calculated by the equation $X=N_{n-1}/[M\times T]$, where:

T is a time interval that is determined by the difference between the time when the previous reading is over and the time when the present reading begins, M is the basic single speed for the CD drive, and $N_{n-1}$ is the number of blocks of data of the previous reading.

8. A method of adjusting the speed of a CD drive that is coupled to a host, comprising:

receiving a command from the host;

calculating the processing speed required by the host for executing the received command; and decreasing the processing speed of the CD drive if the required processing speed of the host is less than the current processing speed of the CD drive.

9. The method of claim 8, wherein the step of increasing the processing speed of the CD drive further includes:

determining whether the required processing speed of the host is less than the current processing speed of the CD drive for n consecutive commands.

10. The method of claim 8, further including:

reading data from a disc in the CD drive.

11. The method of claim 8, wherein the processing speed required by the host for executing the received command is calculated by the equation $X=N_{n-1}/[M\times T]$, where:

T is a time interval that is determined by the difference between the time when the previous reading is over and the time when the present reading begins, M is the basic single speed for the CD drive, and $N_{n-1}$ is the number of blocks of data of the previous reading.

12. A method of adjusting the speed of a CD drive that is coupled to a host, comprising:

receiving a command from the host;

calculating the processing speed required by the host for executing the received command; and adjusting the processing speed of the CD drive if the required processing speed of the host is either greater than or less than the current processing speed of the CD drive.

13. The method of claim 12, wherein the step of adjusting the processing speed of the CD drive includes either increasing or decreasing the processing speed of the CD drive.

14. The method of claim 12, further including:

reading data from a disc in the CD drive.

15. The method of claim 12, wherein the processing speed required by the host for executing the received command is calculated by the equation $X=N_{n-1}/[M\times T]$, where:

T is a time interval that is determined by the difference between the time when the previous reading is over and the time when the present reading begins, M is the basic single speed for the CD drive, and $N_{n-1}$ is the number of blocks of data of the previous reading.

* * * * *